(12) United States Patent
Ofel et al.

(10) Patent No.: US 7,877,230 B2
(45) Date of Patent: Jan. 25, 2011

(54) SYSTEM AND METHOD FOR ATTRIBUTING A PORTION OF A RESPONSE TIME TO AN ELEMENT OF A VIRTUAL NETWORK

(75) Inventors: Gal Ofel, Binyamina (IL); Shlomo Jacobson, Modi'in (IL); Yair Horovitz, Mazkeret Batya (IL)

(73) Assignee: Shunra Software Ltd., Kfar Saba (IL)

( * ) Notice: Subject to any disclaimer, the term of this patent is extended or adjusted under 35 U.S.C. 154(b) by 171 days.

(21) Appl. No.: 11/724,295

(22) Filed: Mar. 15, 2007

(65) Prior Publication Data

US 2008/0228914 A1 Sep. 18, 2008

(51) Int. Cl.
G06F 11/30 (2006.01)

(52) U.S. Cl. ..................................... 702/182

(58) Field of Classification Search ................ 702/182, 702/79, 108, 117, 118, 125, 176, 189; 703/13, 703/14, 16, 17, 21, 23, 26; 709/223, 224
See application file for complete search history.

(56) References Cited

U.S. PATENT DOCUMENTS

| | | | | |
|---|---|---|---|---|
| 5,572,710 A | * | 11/1996 | Asano et al. | 703/15 |
| 5,732,213 A | * | 3/1998 | Gessel et al. | 709/224 |
| 5,889,954 A | * | 3/1999 | Gessel et al. | 709/223 |
| 5,909,569 A | * | 6/1999 | Housel et al. | 703/21 |
| 5,911,059 A | * | 6/1999 | Profit, Jr. | 703/23 |
| 6,560,648 B1 | * | 5/2003 | Dunn et al. | 709/224 |
| 6,985,940 B1 | * | 1/2006 | Jenkin | 709/224 |
| 7,437,281 B1 | * | 10/2008 | Saghier et al. | 703/22 |
| 7,478,018 B1 | * | 1/2009 | Lavallee et al. | 703/2 |
| 7,516,227 B2 | * | 4/2009 | Cohen | 709/228 |
| 7,596,484 B1 | * | 9/2009 | Patel et al. | 703/26 |
| 2001/0049594 A1 | * | 12/2001 | Klevans | 703/14 |
| 2003/0115266 A1 | * | 6/2003 | Sweet et al. | 709/203 |
| 2004/0105391 A1 | * | 6/2004 | Charcranoon | 370/252 |
| 2005/0055195 A1 | * | 3/2005 | Hernandez-Mondragon et al. | 703/23 |
| 2005/0185632 A1 | * | 8/2005 | Draves et al. | 370/351 |
| 2008/0104230 A1 | * | 5/2008 | Nasuto et al. | 709/224 |

FOREIGN PATENT DOCUMENTS

WO WO 2006/045322 * 5/2006

OTHER PUBLICATIONS

Turrubiartes et al., "Analysis of IP Network Path Capacity Estimation using a Variable Packet", IEEE, Feb. 2005, pp. 177-182.*
Prasad et al., "The effect of layer-2 store-and-forward devices on per-hop capacity estimation", IEEE, Apr. 2003, pp. 2090-2100, vol. 3.*

* cited by examiner

*Primary Examiner*—Michael P Nghiem
*Assistant Examiner*—Cindy H Khuu
(74) *Attorney, Agent, or Firm*—Pearl Cohen Zedek Latzer, LLP

(57) ABSTRACT

A system and method for evaluating a portion of a response time of an application that is attributable to an element on a virtual IP network by emulating a condition on a network, running the application on the network under the emulated network conditions and measuring a portion of the response time of the application that is attributable to elements on the network under such emulated conditions. The application may be varied and response times of various network elements may be measured under one or more of the variations.

19 Claims, 3 Drawing Sheets

---

EVALUATING A PORTION OF A RESPONSE TIME OF AN APPLICATION RUN OVER A VIRTUAL NETWORK, SAID PORTION ATTRIBUTED TO AN ELEMENT OF A PLURALITY OF ELEMENTS IN SAID VIRTUAL NETWORK.

300

EVALUATING A PORTION OF A RESPONSE TIME OF AN APPLICATION RUN OVER A VIRTUAL NETWORK, SAID PORTION ATTRIBUTED TO AN ELEMENT OF A PLURALITY OF ELEMENTS IN SAID VIRTUAL NETWORK.

FIG.3

SYSTEM AND METHOD FOR ATTRIBUTING A PORTION OF A RESPONSE TIME TO AN ELEMENT OF A VIRTUAL NETWORK

FIELD OF THE INVENTION

The present invention generally relates to testing application traffic over a network. More particularly, the present invention relates to a system and method for determining a portion of a response time of an application that is attributable to an element of a virtual network.

BACKGROUND OF THE INVENTION

Testing performance time of an application over a virtual network involves measuring an application's total response time. Such response time may be the sum of the time periods during which application traffic spends over the elements it passes through in the network, until a response to a particular command is received. Total response time of an application may not reveal where in a chain or path of network elements a bottleneck exists, and the extent to which one or more of such bottlenecks may contribute to the total response time. This information may help in optimizing application response time, testing the impact of application parameters on application response time, testing the impact of network parameters on application performance time, and more.

SUMMARY OF THE INVENTION

Embodiments of the invention may include a system having a processor to evaluate a portion of a response time of an application, where the application is run over a virtual network, and where the portion is attributed to one of several elements on the virtual network. In some embodiments, the system may include a memory to store a measure of a delay of one or more of the elements. In some embodiments, the memory may store predefined criteria for the portion of the response time, and the processor may produce an indication when the portion matches or exceeds the criteria. In some embodiments the memory may store indication such as an alarm or warning when the portion exceeds or reaches a pre-defined criterian and the system may include a display to show an indication of the element and the portion attributed to the element.

In some embodiments, a a value may be calculated when the network is subject to a given constraint or parameter. The processor may alter the parameter for the element and calculate a second value for the portion attributed to said element when the element is subject to a second constraint or parameter. The processor may compare the portions.

In some embodiments the processor may calculate several portions for several runs of an application.

In some embodiments the processor may calculate parameters such as for example a maximum period of the portion of the response time attributed to the element, an average period of the response time attributed to the element, a minimum period of the portion of the response time attributed to the element, a median period of the portion of the response time attributed to the element, a 90th percentile period of the portion of the response time attributed to the element, and a standard deviation of a period of the portion of the response time attributed to the element.

In some embodiments the processor may measure a portion of the response time attributed to the element.

In some embodiments the processor may evaluate the portion of the response time for one or more network routes.

In some embodiments the application may be varied, and a portion of the response time may be attributed to one or more versions of the application for a given element Some embodiments of the invention may include a method for measuring a portion of a response time of an application on a virtual network, where the portion is attributed to an element of on the virtual network.

In some embodiments, a predefined criteria may be stored for the portion attributed to an element, such as a maximum, minimum or other criteria, and a signal or indication may be given when the portion of the response time attributed to that element reaches or exceeds the predefined criteria.

In some embodiments, instructions may be stored on an article such as a memory, and when such instructions are executed by a processor, there is generated an embodiment of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

FIG. 3 is a flow diagram of a method in accordance with an embodiment of the invention.

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout tile specification, discussions utilizing terms such as "selecting," "evaluating," "processing," "computing," "calculating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. An embodiment of the invention may be practiced through the execution of instructions that may be stored on an article such as a disc, memory device or other mass data storage article. Such instructions may be for example loaded into a processor and executed.

Figure 1:
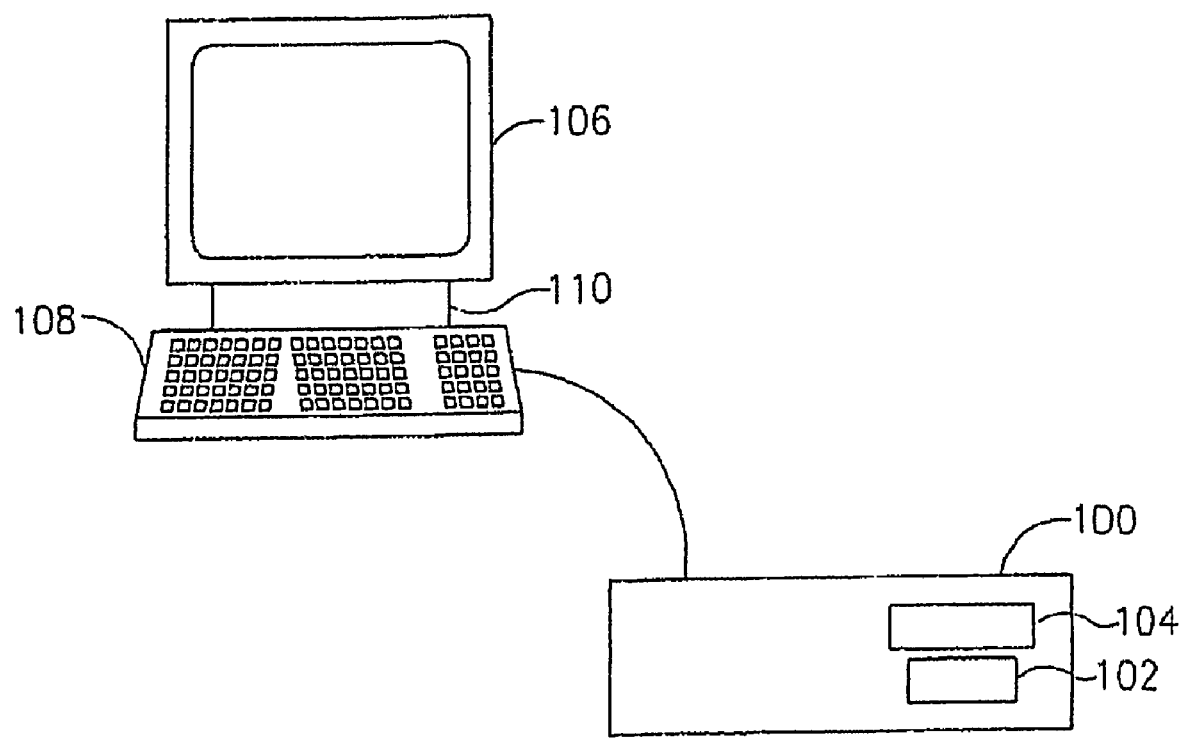
FIG. 1 is a conceptual illustration of elements that may be used in creating a virtual network, in accordance with a preferred embodiment of the present invention.

Reference is made to FIG. 1, a conceptual illustration of elements such as a network emulator or other system that may simulate network conditions, in accordance with a preferred embodiment of the present invention. In some embodiments, elements that may be used in emulating or simulating a network may include for example an emulator 100, such as a VE Network Appliance available from Shunra Software Ltd. of Kfar Sava, Israel. Other appliances may be used. Emulator 100 may be or include for example a processor 104 and a memory 102. Processor 104 and memory 102 may, among other functions, simulate a virtual network according to a model that may for example be input by the user. Emulator 100 may simulate a network during execution of one or more applications over the network, including transmissions of data over a series of virtual links or virtual connections between points over the virtual network or that are external to the virtual network, and such may be simulated on or in the presence of various conditions to which the virtual network may be subject.

Memory 102 may be or include for example random access memory, read only memory, flash or non-volatile memory, a disc drive, other magnetic storage medium or other mass data storage medium that may record and store data about network connections in a virtual network. In some embodiments, processor 104 may calculate performance metrics for the application. In some embodiments, a metric may include for example a total response time of an application executed over the virtual network. Other metrics may be calculated.

In operation, an embodiment of the invention may measure, evaluate or calculate a period between the time that traffic of an application enters or is introduced to an element or component of the virtual network, and the time that such traffic exits or proceeds from such element. The period between such introduction time and such exit time for a packet or other segment of traffic may be recorded for one or more elements on the virtual network. In some embodiments, one or more portions of the total response time may be attributed to one or more elements on the virtual network over which the traffic flowed.

Memory 102 may store for example connection constraints such as latency, utilization, bandwidth, packet loss and other characteristics of a network element or network point. In some embodiments, memory 102 may store the delay characteristics of an element in the virtual IP network.

A display 106 may display for example real time or stored representations of a structure of a virtual network and one or more constraints of points on such network. In some embodiments, display 106 may include a user interface that may allow a user or operator to add, delete, replace or alter connections on a virtual network or characteristics or constraints of such connections or points Display 106 may be connected to for example an input device 108 such as for example a keyboard or mouse. In some embodiments, display 106 may present a chronologic and/or graphic depiction of the route of traffic on the virtual network and the various delays or proportions of delays attributable to an element on the virtual network.

In some embodiments, one or more functions of emulator 100 may be included in for example instructions such as for example software instructions that may be executed on a platform such as for example a personal computer or a work station 110. In some embodiments, processor 104 and memory 102 may be included in such a platform. Some embodiments may include a separate network appliance 100 in one or more separate units, or may combine emulator 100 into another unit. Some embodiments may not designate emulator 100.

Figure 2:
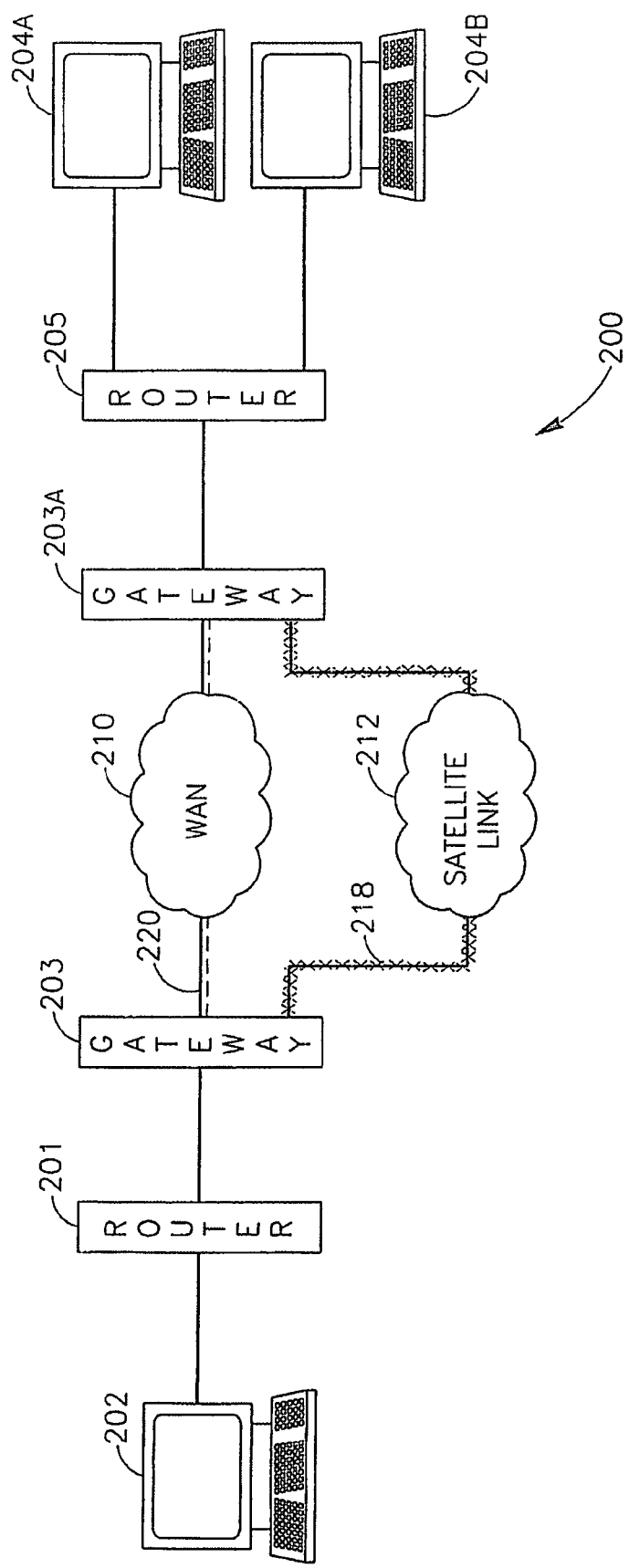
FIG. 2 is a conceptual illustration of a virtual network, that may for example be simulated by the elements of FIG. 1, in accordance with a preferred embodiment of the present invention.

Reference is made to FIG. 2, a conceptual illustration of a virtual network that may for example be simulated by the elements of FIG. 1, in accordance with a preferred embodiment of the present invention. It will be appreciated that for simplicity and clarity, elements included in a virtual network such as those that may be created by emulator 100 may be virtual rather than actual, though they may, upon a simulation, demonstrate the characteristics of an actual network. In some embodiments, a virtual network 200 may include one or more virtual endpoints 202, 204A and 204B. In some embodiments, such an endpoint may include one or more clients or user computers that may be connected to the virtual network 200 such as for example computers, IP telephones, personal communication devices or other electronic devices that may be suitable for communicating or connecting over virtual network 200. End point 202 may be connected in the virtual network directly or indirectly with for example a virtual router 201 or other element that may connect endpoint 202 to a virtual gateway 203. The characteristics of one or more of these virtual elements may be assigned by for example a user of emulator 100.

In some embodiments, virtual gateway 203 may further connect data or signals to and from end point 202 to a virtual carrier of IP traffic such as an emulation of a WAN 210 or a satellite link 212. The WAN 210 or the satellite link 212 may further connect the data or signals to and from the second virtual gateway 203A. The second virtual gateway 203A may further connect the data or signals to and from a router 205. The router 205 may further connect the data or signals to and from end point 204A or 204B. In some embodiments, virtual gateway 203 may connect or link one or more traffic carrying mediums to another one or more traffic carrying mediums.

In some embodiments, a virtual flow of data, signals or traffic between endpoints of virtual network 200, such as endpoint 202 and endpoint 204A, may for example flow on one route selected from a number of routes, e.g., a route 218 (shown in the figures as a regular line with x's), or may flow on another selected route 220 (shown in the figures as a dotted line next to a regular line). Gateway 203 may select the route to be used, or processor 104 may assign the route to be used, or the route may be selected in any other suitable manner.

In some embodiments, a response time of an application may be distributed over one, some or all of the elements of virtual network 200 in a selected route, e.g., oil router 201, gateway 203, WAN 210, gateway 203A and router 205. In some embodiments, during a run of the application over virtual network 200, processor 104 may evaluate or measure an entry time of a packet or other data segment into a particular element of the virtual network, and a time when such packet or other data segment exits or emerges from the network element. In some embodiments, the absolute difference between such times may be recorded and for example displayed on display 106. In some embodiments, the portion of response time may be calculated based on predefined parameters of the network elements. Additionally or in the alternative, some or all of the total response time of the traffic may be apportioned or attributed to the period during which the packet or data are in or effected by the particular element or part of the route. In some embodiments, a portion of the time that application traffic spends in an element of the virtual network may be displayed or calculated as a portion or percentage of the total response time or in units that designate time such as milliseconds, seconds etc. For example, a user may examine the amount of time traffic spends at WAN 210 and at gateway 203A under specific network conditions or application parameters, or may use a first route 218 or another route 220 for running an application or transmitting traffic. An application may be run over first route 218 and second route 220, and a total response time of the application may be recorded for each such run on the respective routes. The total response time may be broken down into the portions of time attributable to particular elements along each such route 218 and 220. A user may find that while a total response time on first route 218 is longer than on second route 220, a large portion of such total response time on the first route 218 may be attributable to one or more elements along such first route 218. A user may engineer a change that maintains the first route 218 but substitutes one or more elements to which had been attributed large portions of the total response time. Additionally or alternatively, a user may alter the configuration of these elements.

In some embodiments, memory 102 may store the evaluated portions of response time and data about the virtual network elements, and may also store criteria or threshold values for the evaluated durations or portions of the response time of the network elements. In some embodiments, processor 104 may produce an indication when a portion of the response time of a network element matches criteria related to the element, such as a threshold of duration being exceeded, to indicate problematic or adverse conditions of the traffic on the element, such as a bottleneck in the flow of data. Memory 102 may store the indication, and display 106 may display the indication. For example, in some embodiments, a system may be set to list or warn a user of one or more elements of the virtual network that account for more than a given percentage of the total response time.

In some embodiments, a user may create a virtual network, designate a first set of parameters to the virtual elements, run an application over the virtual network and evaluate the first set of portions of application response time for one or more network elements. A user may alter one or more parameters of one or more of the virtual elements, run the application a second time, and evaluate a second set of portions of application response time under altered conditions, to examine the impact of network parameter values on application performance. Processor 104 may compare the portions of response time of one or more network elements in the first evaluation and in the second evaluation. This may help, for example, in finding whether a network parameter may be the reason for an application malfunction, and which of the network parameters may be the limiting factor. For example, a user may designate parameters to router 201, gateway 203, WAN 210, gateway 203A, and router 205, such as 1 Gb bandwidth for router 201, 512K bandwidth for gateway 203, 100 msec latency for WAN 210, 1024K bandwidth for gateway 203A and 1 Gb bandwidth for router 205, run an application over the virtual network, and evaluate the first set of portions of application response time for these elements, resulting in, for example 5 msec, 50 msec, 100 msec, 25 msec and 5 msec delay respectively. A user may alter the bandwidth of gateway 203 from 512K to 1024K, run the application a second time, and evaluate a second set of portions of application response time under altered conditions. Results of 5 msec, 25 msec, 100 msec, 25 msec and 5 msec delay respectively may indicate, that the bandwidth of gateway 203 is a factor which adversely affects the application performance, enabling the user, for example, to fix this issue before distributing the application.

In some embodiments, a user, for example, may create a virtual network, designate parameters to the virtual elements, run an application over the virtual network and evaluate one or more portions of application response time attributable to one or more network elements. The user may then repeat running the application while recording the evaluations results for the same virtual network a number of times. Display 106 may chart the evaluations results. Memory 102 may record the evaluation results, and processor 104 may calculate statistical parameters or other parameters over the ensembles of the evaluations results, such as, for example, the collection of evaluations attributed to a network element, or to a group of network element. Such parameters may include a maximum, minimum, average, median, 90th percentile, standard deviation, or other statistical parameter of the ensembles of the evaluations results, as known in the art. A system in accordance with the above embodiment of the invention may provide the user with statistical information regarding application performance, for example, an application may be run a number of times to reveal extreme values of portions of response times which occur rarely or less frequently. For example, a user may designate parameters to router 201, gateway 203, WAN 210, gateway 203A, and router 205 such as for example a pre-defined delay of traffic that may be caused by or that may occur in router 201, or gateway 203. A user may run or simulate an application over the virtual network, evaluate portions of the application response time for the router 201 or gateway 203, and then repeat running the application for this virtual network using a different router 205 or a different set of parameters for one or more of router 201 or gateway 203 or other routers or gateways, and different gateway. Memory 102 may record the evaluation results, and processor 104 may calculate statistical parameters or other parameters over the statistical ensemble of the portions of response time for one or more of the elements, such as the maximum, minimum, and the average of the delays attributed to gateway 203.

In some embodiments, a user, for example, may designate a first route in the virtual network, run the application and evaluate portions of application response time of network elements in the route, designate a second route, run the application and evaluate portions of response time of network elements in the second route, and compare portions of response time of the network elements in the first and in the second route. This embodiment may, for example, help the user to decide which route to use, and identify the network elements which may adversely affect application performance. For example, a user may designate route 220, run the application and evaluate portions of application response time of router 201, gateway 203, WAN 210, gateway 203A and router 205. The user may designate route 218, run the application and evaluate portions of application response time of router 201, gateway 203, satellite link 212, gateway 203A and router 205, and compare total portions of response time of network elements in the first and in the second route.

In some embodiments, a user may run an application and evaluate portions of application response time of one or more network elements, change the application to a second application, run the second application over the same virtual network, evaluate portions of response time of the second application on some or all of the examined network elements, and compare portions of the response time of the same network elements evaluated with the first and second applications. This embodiment may, for example, assist in optimizing the application and application parameters regarding performance time. For example, a user may run an application over the virtual network and evaluate portions of application response time of router 201, gateway 203, WAN 210, gateway 203A and router 205; a user may run a second application, for example the first application with a change of one or more parameters or with a different subroutine, over the same virtual network and evaluate portions of application response time of the same network elements. The system may in some embodiments compare total response time and portions of response time of the network elements with the first and with the second application.

Reference is made to FIG. 3, a flow diagram of a method in accordance with an embodiment of the invention. In block 300 a processor and a memory which may for example be included in an emulator or simulation device, may evaluate a portion of a response time of an application run over a virtual network, which may be the portion that the application traffic spends at an element of a number of elements in the virtual network.

It will be appreciated by persons skilled in the art that embodiments of the invention are not limited by what has been particularly shown and described hereinabove. Rather the scope of at least one embodiment of the invention is defined by the claims below.

We claim:

1. A system comprising a processor to simulate a network and to create a plurality of virtual elements in said network, and further to simulate a network condition and to measure a portion of a response time of an application, said application run-over said simulated network under said simulated condition, said portion attributed to one of said virtual elements:
    wherein said portion comprises a first value for said portion, and wherein a parameter value of said element is equal to a first parameter value for said element, and
    wherein said processor is to:
    alter said first parameter value for said element to a second parameter value for said element;
    calculate a second value for said portion of said response time attributed to said element, said second value for said portion evaluated under said second parameter value for said element; and
    wherein said processor is to compare said first value for said portion to said second value for said portion.

2. The system as in claim 1, comprising a memory to store a delay parameter of said element of said plurality of elements.

3. The system as in claim 1, comprising a memory to store predefined criteria for said portion of said response time; and wherein said processor is to produce an indication upon said portion matching said criteria.

4. The system as in claim 3, wherein said memory is to store said indication, and comprising a display to show said indication of said element.

5. The system as in claim 1, wherein said processor is to calculate a plurality of said portions of said response time resulting from a plurality of runs of said application.

6. The system as in claim 1, wherein said processor is to calculate a parameter selected from the group consisting of:
    a maximum period of said portion of said response time attributed to said element in a plurality of executions of said application,
    an average period of said response time attributed to said element in said plurality of executions of said application,
    a minimum period of said portion of said response time attributed to said element in said plurality of executions of said application,
    a median period of said portion of said response time attributed to said element in a plurality of executions of said application,
    a 90th percentile period of said portion of said response time attributed to said element in said plurality of executions of said application, and
    a standard deviation of a period of said portion of said response time attributed to said element in said plurality of execution of said application.

7. The system as in claim 1, wherein said processor is to measure a portion of said response time attributed to said element.

8. The system as in claim 1, wherein said processor is to measure said portion of said response time for a plurality of alternative network routes.

9. A system comprising a processor to simulate a network and to create a plurality of virtual elements in said network, and further to simulate a network condition and to measure a portion of a response time of an application, said application run-over said simulated network under said simulated condition, said portion attributed to one of said virtual elements, wherein said application comprises a first application, and wherein said processor is to:
    evaluate a portion of a response time of a second application executed on said network, said portion of said response time of said second application attributed to said element of said plurality of elements in said network; and
    compare said portion of said response time of said first application to said portion of said response time of said second application attributed to said element.

10. A method comprising:
    simulating by a computing device a virtual network and creating a plurality of virtual elements in said network;
    simulating a network condition on said virtual network;
    measuring a portion of a response time of an application on said virtual network under said simulated condition, said portion attributed to one of said virtual elements; and
    displaying on a display device coupled to said computing device an indication when a portion of said response time of said virtual network element matches a criteria related to said element;
    wherein said portion comprises a first value for said portion and comprising:
        altering a parameter of said element;
        measuring a second value for said portion of said response time, said second value attributed to said element under said altered parameter; and
        comparing said first value for said portion to said second value for said portion.

11. The method as in claim 10, comprising displaying a plurality of values of said portion attributed to a plurality of said elements in said virtual network.

12. The method as in claim 10, comprising:
    executing said application a plurality of times; and
    calculating a parameter selected from the group consisting of:
    a maximum period of said portion of said response time attributed to said element in said plurality of times,
    a minimum period of said portion of said response time attributed to said element in said plurality of times,
    an average period of said response time attributed to said element in said plurality of times, a median of the periods of said portion of said response time attributed to said element in said plurality of times, a 90th percentile of the periods of said portion of said response time attributed to said element in said plurality of times, and a standard deviation of the period of said portion of said response time attributed to said element in said plurality of times.

13. The method as in claim 10, comprising storing a predefined criteria for said portion of said response time.

14. The method as in claim 10, comprising evaluating said portion of said response time for a plurality of alternative network routes.

15. A non-transitory computer readable medium containing computer instructions stored therein for causing a computer processor to perform:

simulating a virtual network and creating a plurality of virtual elements in said network;

simulating a network condition on a virtual network; and measuring a portion of a response time of an application on said virtual network under said simulated network condition, said portion attributed to one of said virtual elements;

wherein said portion comprises a first value for said portion and comprising:

altering a parameter of said element;

measuring a second value for said portion of said response time, for said element under said altered parameter; and comparing said first value for said portion to said second value for said portion.

16. A non-transitory computer readable medium as in claim 15, comprising displaying a portion of said response time attributed to a plurality of said elements in said virtual network.

17. A non-transitory computer readable medium as in claim 15, comprising:

executing said application a plurality of times; and calculating a parameter selected from the group consisting of:

a maximum period of said portion of said response time attributed to said element in said plurality of times, a minimum period of said portion of said response time attributed to said element in said plurality of times, an average period of said response time attributed to said element in said plurality of times, a median of the periods of said portion of said response time attributed to said element in said plurality of times, a 90th percentile of the periods of said portion of said response time attributed to said element in said plurality of times, and a standard deviation of the period of said portion of said response time attributed to said element in said plurality of times.

18. A non-transitory computer readable medium as in claim 15, comprising: storing a predefined criteria for said portion of said response time; and producing an indication upon said portion matching said criteria.

19. A non-transitory computer readable medium as in claim 15, comprising evaluating said portion of said response time for a plurality of alternative network routes.

* * * * *